(12) United States Patent
Holland

(10) Patent No.: US 11,188,215 B1
(45) Date of Patent: Nov. 30, 2021

(54) SYSTEMS AND METHODS FOR PRIORITIZING DIGITAL USER CONTENT WITHIN A GRAPHICAL USER INTERFACE

(71) Applicant: Facebook, Inc., Menlo Park, CA (US)

(72) Inventor: Jason Holland, Mountain View, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 17/008,083

(22) Filed: Aug. 31, 2020

(51) Int. Cl.
G06F 3/0482 (2013.01)
G06F 3/0485 (2013.01)
H04L 29/08 (2006.01)
H04L 12/58 (2006.01)

(52) U.S. Cl.
CPC .......... *G06F 3/0485* (2013.01); *G06F 3/0482* (2013.01); *H04L 51/32* (2013.01); *H04L 67/306* (2013.01)

(58) Field of Classification Search
CPC .................................. G06F 3/048–05
See application file for complete search history.

(56) References Cited

U.S. PATENT DOCUMENTS

| | | |
|---|---|---|
| D599,366 S | 9/2009 | Brown et al. |
| D599,368 S | 9/2009 | Kanga et al. |
| D608,365 S | 1/2010 | Walsh et al. |
| D614,643 S | 4/2010 | Viegers et al. |
| D648,735 S | 11/2011 | Arnold et al. |
| D651,608 S | 1/2012 | Allen et al. |
| D664,561 S | 7/2012 | Gleasman et al. |
| D664,988 S | 8/2012 | Gleasman et al. |
| D692,456 S | 10/2013 | Brinda et al. |
| D692,915 S | 11/2013 | Brinda et al. |
| D699,744 S | 2/2014 | Ho Kushner et al. |
| 8,645,463 B2 | 2/2014 | Knight et al. |
| D701,227 S | 3/2014 | Lee |

(Continued)

FOREIGN PATENT DOCUMENTS

WO 2015/149375 A1 10/2015

OTHER PUBLICATIONS

U.S. Appl. No. 16/358,032, filed Mar. 19, 2019.
(Continued)

*Primary Examiner* — Daniel Rodriguez
(74) *Attorney, Agent, or Firm* — FisherBroyles, LLP

(57) ABSTRACT

A computer-implemented method for prioritizing digital user content in a graphical user interface may include (i) for each user account within a group of user accounts maintained by a social networking platform, (1) maintaining a user content pod, comprising a digital container for posts posted to the social networking platform by the user account, and (2) generating a scrollable pod display comprising visual representations of other user content pods being followed by the user account, (ii) receiving, from a first user account corresponding to a first user content pod, user input designating a post within the first user content pod as a broadcasted post, and (iii) in response to receiving the user input, prioritizing, within a scrollable pod display of a second user account, a visual representation of the first user content pod over visual representations of user content pods that do not contain broadcasted posts. Various other methods, systems, and computer-readable media are also disclosed.

20 Claims, 9 Drawing Sheets

(56) References Cited

U.S. PATENT DOCUMENTS

| | | |
|---|---|---|
| D716,339 S | 10/2014 | Lee |
| D730,383 S | 5/2015 | Brinda et al. |
| D730,386 S | 5/2015 | Ryan et al. |
| D736,247 S | 8/2015 | Chen et al. |
| D736,248 S | 8/2015 | Chen et al. |
| 9,152,312 B1 * | 10/2015 | Terleski ............... G06F 3/0482 |
| D746,866 S | 1/2016 | Memoria et al. |
| D753,709 S | 4/2016 | Kawanabe |
| D755,239 S | 5/2016 | Lee et al. |
| D755,814 S | 5/2016 | Rad et al. |
| D757,086 S | 5/2016 | Kang |
| D759,666 S | 6/2016 | Kuhn et al. |
| D762,671 S | 8/2016 | Chan et al. |
| D765,101 S | 8/2016 | Park et al. |
| D766,308 S | 9/2016 | Park et al. |
| D769,295 S | 10/2016 | Han et al. |
| D769,306 S | 10/2016 | Bowen et al. |
| D781,328 S | 3/2017 | Fong et al. |
| D785,028 S | 4/2017 | Federighi et al. |
| D785,643 S | 5/2017 | Boa et al. |
| D789,396 S | 6/2017 | Alonso Ruiz et al. |
| D789,969 S | 6/2017 | Chaudhri et al. |
| D789,983 S | 6/2017 | Kim |
| D794,651 S | 8/2017 | Cavander et al. |
| D798,331 S | 9/2017 | Fong et al. |
| D800,754 S | 10/2017 | De Cock et al. |
| D803,869 S | 11/2017 | Kuhn et al. |
| D806,741 S | 1/2018 | Majernik et al. |
| D807,898 S | 1/2018 | Memoria et al. |
| D808,413 S | 1/2018 | Wu et al. |
| D809,003 S | 1/2018 | Sowden et al. |
| D815,130 S | 4/2018 | Phillips et al. |
| D815,666 S | 4/2018 | Burns |
| D816,110 S | 4/2018 | Choi et al. |
| D816,701 S | 5/2018 | Ball et al. |
| D817,972 S | 5/2018 | Karunamuni et al. |
| 9,998,796 B1 | 6/2018 | Kedenburg, III et al. |
| 10,009,308 B2 | 6/2018 | Brunn et al. |
| D824,944 S | 8/2018 | Sagrillo et al. |
| D825,594 S | 8/2018 | Wu et al. |
| D831,059 S | 10/2018 | Bao |
| D832,876 S | 11/2018 | Chung et al. |
| D834,602 S | 11/2018 | Bao |
| D836,118 S | 12/2018 | Patel |
| D836,121 S | 12/2018 | Leong et al. |
| D842,867 S | 3/2019 | Jedrzejowicz et al. |
| D845,324 S | 4/2019 | Hemsley et al. |
| D847,855 S | 5/2019 | Majernik et al. |
| D853,431 S | 7/2019 | Sagrillo et al. |
| D854,031 S | 7/2019 | Alvarez et al. |
| D858,552 S | 9/2019 | Westerhold et al. |
| D859,446 S | 9/2019 | Westerhold et al. |
| D859,450 S | 9/2019 | Krishna |
| D860,227 S | 9/2019 | Fung et al. |
| D860,233 S | 9/2019 | Chaudhri et al. |
| D862,501 S | 10/2019 | Patel |
| D863,324 S | 10/2019 | Kang et al. |
| D868,804 S | 12/2019 | Bragdon |
| D870,141 S | 12/2019 | Bowden et al. |
| D877,762 S | 3/2020 | Feng et al. |
| D879,127 S | 3/2020 | Feng et al. |
| D879,829 S | 3/2020 | Amini et al. |
| D881,219 S | 4/2020 | Ngo et al. |
| D881,220 S | 4/2020 | Feng et al. |
| D882,593 S | 4/2020 | Fatnani et al. |
| D882,608 S | 4/2020 | Murphy et al. |
| D882,609 S | 4/2020 | Murphy et al. |
| D882,612 S | 4/2020 | Antilion et al. |
| D882,613 S | 4/2020 | Zumbrunnen et al. |
| 10,623,917 B1 | 4/2020 | Paul |
| 10,628,392 B1 * | 4/2020 | Charytoniuk ............ G06F 16/21 |
| D885,410 S | 5/2020 | Butler |
| D885,421 S | 5/2020 | Lunaparra et al. |
| D886,128 S | 6/2020 | Fatnani et al. |
| D887,428 S | 6/2020 | Fatnani et al. |
| D890,198 S | 7/2020 | Paul |
| D890,204 S | 7/2020 | Bussière et al. |
| D894,206 S | 8/2020 | Naruns et al. |
| D895,664 S | 9/2020 | Baber et al. |
| D900,833 S | 11/2020 | Alonso Ruiz et al. |
| D900,845 S | 11/2020 | Tomori |
| D904,426 S | 12/2020 | Paul |
| D904,431 S | 12/2020 | Park et al. |
| D904,432 S | 12/2020 | Park et al. |
| D905,095 S | 12/2020 | Park et al. |
| 10,852,915 B1 | 12/2020 | Behzadi et al. |
| 10,868,788 B1 | 12/2020 | Underwood et al. |
| D910,054 S | 2/2021 | Silfver et al. |
| D910,064 S | 2/2021 | Paul |
| D912,075 S | 3/2021 | Sharp et al. |
| D913,304 S | 3/2021 | VanDuyn et al. |
| D913,306 S | 3/2021 | Davem et al. |
| D913,314 S | 3/2021 | Paul |
| D914,726 S | 3/2021 | Gouliard et al. |
| D914,741 S | 3/2021 | Anzures et al. |
| D915,440 S | 4/2021 | Kim et al. |
| D916,884 S | 4/2021 | Dascola et al. |
| 10,970,329 B1 * | 4/2021 | Al Majid ................ G06F 16/86 |
| 2004/0021673 A1 | 2/2004 | Alessi et al. |
| 2008/0034307 A1 | 2/2008 | Cisler et al. |
| 2009/0148124 A1 | 6/2009 | Athsani et al. |
| 2009/0177754 A1 | 7/2009 | Brezina et al. |
| 2009/0216859 A1 | 8/2009 | Dolling |
| 2009/0313578 A1 | 12/2009 | Roh et al. |
| 2009/0327939 A1 | 12/2009 | Johns et al. |
| 2010/0211872 A1 | 8/2010 | Rolston et al. |
| 2010/0231533 A1 | 9/2010 | Chaudhri |
| 2011/0010182 A1 | 1/2011 | Turski et al. |
| 2011/0010659 A1 | 1/2011 | Kim et al. |
| 2011/0016417 A1 | 1/2011 | Shiplacoff et al. |
| 2011/0246502 A1 * | 10/2011 | Aguera y Arcas ..... G06F 16/43 |
| | | 707/769 |
| 2011/0252381 A1 | 10/2011 | Chaudhri |
| 2011/0271328 A1 | 11/2011 | Sutton-Shearer |
| 2011/0283304 A1 | 11/2011 | Roberts et al. |
| 2011/0289067 A1 | 11/2011 | Jordan et al. |
| 2012/0005224 A1 | 1/2012 | Ahrens et al. |
| 2012/0089950 A1 | 4/2012 | Tseng |
| 2012/0110052 A1 | 5/2012 | Smarr et al. |
| 2012/0110621 A1 | 5/2012 | Gossweiler, III |
| 2012/0151322 A1 | 6/2012 | Lindsay et al. |
| 2012/0151342 A1 | 6/2012 | Trotta et al. |
| 2012/0151415 A1 | 6/2012 | Park et al. |
| 2012/0210386 A1 | 8/2012 | Kim et al. |
| 2012/0271883 A1 | 10/2012 | Montoya et al. |
| 2013/0073976 A1 | 3/2013 | McDonald et al. |
| 2013/0097556 A1 | 4/2013 | Louch |
| 2013/0106903 A1 | 5/2013 | Nagata et al. |
| 2013/0145291 A1 | 6/2013 | Weber et al. |
| 2013/0254709 A1 | 9/2013 | Koshimae et al. |
| 2013/0268490 A1 * | 10/2013 | Keebler ............... G06F 16/9535 |
| | | 707/627 |
| 2013/0290118 A1 * | 10/2013 | Kast ...................... G06F 16/437 |
| | | 705/14.73 |
| 2013/0312027 A1 | 11/2013 | Baumel et al. |
| 2014/0032672 A1 | 1/2014 | Yoshikawa et al. |
| 2014/0047074 A1 | 2/2014 | Chung et al. |
| 2014/0049692 A1 | 2/2014 | Sirpal et al. |
| 2014/0149506 A1 * | 5/2014 | Yuan ........................ H04L 67/02 |
| | | 709/204 |
| 2014/0189010 A1 | 7/2014 | Brown et al. |
| 2014/0244659 A1 | 8/2014 | Liu et al. |
| 2014/0258110 A1 | 9/2014 | Davis et al. |
| 2014/0282208 A1 | 9/2014 | Chaudhri |
| 2014/0317116 A1 | 10/2014 | Shah et al. |
| 2014/0317201 A1 | 10/2014 | McNeil et al. |
| 2014/0317660 A1 | 10/2014 | Cheung et al. |
| 2014/0359789 A1 | 12/2014 | Pitt |
| 2015/0022558 A1 | 1/2015 | Li |
| 2015/0049591 A1 | 2/2015 | Adams et al. |
| 2015/0067582 A1 * | 3/2015 | Donnelly ............... G06F 3/0485 |
| | | 715/784 |
| 2015/0113436 A1 | 4/2015 | Penha et al. |
| 2015/0154676 A1 | 6/2015 | Matousek et al. |

(56) References Cited

U.S. PATENT DOCUMENTS

| | | | |
|---|---|---|---|
| 2015/0200985 A1 | 7/2015 | Feldman et al. | |
| 2015/0242514 A1* | 8/2015 | Simon | G06Q 50/01 |
| | | | 715/739 |
| 2015/0358584 A1* | 12/2015 | Mattson | G06F 3/04842 |
| | | | 348/14.08 |
| 2015/0370798 A1 | 12/2015 | Ju et al. | |
| 2016/0057154 A1 | 2/2016 | Ferguson et al. | |
| 2016/0171453 A1 | 6/2016 | Zorfas | |
| 2016/0197993 A1 | 7/2016 | Perkowski et al. | |
| 2016/0232600 A1 | 8/2016 | Purves | |
| 2016/0330258 A1 | 11/2016 | Sandhu | |
| 2016/0337291 A1 | 11/2016 | Park et al. | |
| 2016/0357305 A1 | 12/2016 | Wells et al. | |
| 2016/0357368 A1 | 12/2016 | Federighi et al. | |
| 2016/0373455 A1 | 12/2016 | Shokhrin et al. | |
| 2016/0380952 A1 | 12/2016 | Vora et al. | |
| 2017/0060349 A1 | 3/2017 | Munoz et al. | |
| 2017/0131864 A1 | 5/2017 | Edgar | |
| 2017/0164063 A1 | 6/2017 | Lewis et al. | |
| 2017/0168692 A1* | 6/2017 | Chandra | G06F 3/017 |
| 2017/0180299 A1 | 6/2017 | Garza | |
| 2017/0195736 A1 | 7/2017 | Chai et al. | |
| 2017/0242899 A1 | 8/2017 | Jolley et al. | |
| 2017/0269791 A1* | 9/2017 | Meyerzon | G06F 3/0481 |
| 2017/0269798 A1* | 9/2017 | Meyerzon | G06F 16/211 |
| 2017/0270535 A1 | 9/2017 | McKee et al. | |
| 2017/0295249 A1 | 10/2017 | Vickrey et al. | |
| 2017/0315677 A1 | 11/2017 | Rice et al. | |
| 2017/0359290 A1 | 12/2017 | Hsu et al. | |
| 2018/0063278 A1 | 3/2018 | Helled et al. | |
| 2018/0113579 A1 | 4/2018 | Johnston et al. | |
| 2018/0121031 A1 | 5/2018 | Ta et al. | |
| 2018/0174106 A1 | 6/2018 | Kenthapadi et al. | |
| 2018/0192142 A1 | 7/2018 | Paul | |
| 2018/0218160 A1 | 8/2018 | Wetherall et al. | |
| 2018/0309806 A1 | 10/2018 | Huynh et al. | |
| 2018/0349485 A1 | 12/2018 | Carlisle et al. | |
| 2018/0349502 A1 | 12/2018 | Maycock | |
| 2018/0365270 A1 | 12/2018 | Azout et al. | |
| 2019/0079659 A1* | 3/2019 | Adenwala | H04W 4/21 |
| 2019/0095067 A1 | 3/2019 | Huang et al. | |
| 2019/0335008 A1 | 10/2019 | Majoros et al. | |
| 2020/0007675 A1 | 1/2020 | Khanukaev | |
| 2020/0151815 A1 | 5/2020 | Whitfield | |
| 2020/0211125 A1 | 7/2020 | McCuskey | |
| 2020/0218413 A1 | 7/2020 | VanDuyn | |
| 2020/0267435 A1 | 8/2020 | Gordon et al. | |
| 2020/0326839 A1 | 10/2020 | Walkin et al. | |
| 2021/0029131 A1 | 1/2021 | Mertens et al. | |
| 2021/0097630 A1 | 4/2021 | Whilby | |
| 2021/0105244 A1 | 4/2021 | O'Rourke et al. | |

OTHER PUBLICATIONS

Final Office Action received for U.S. Appl. No. 16/358,380 dated Apr. 15, 2021, 51 pages.

Non-Final Office Action received for U.S. Appl. No. 17/008,089 dated Mar. 19, 2021, 52 pages.

Peyton, "PS3 Tutorial: Game Menu", URL : https://www.youtube.com/watch?v=j30_ViiptsA, Jul. 29, 2012, 4 pages.

Final Office Action received for U.S. Appl. No. 16/358,962 dated Mar. 15, 2021, 37 pages.

Final Office Action received for U.S. Appl. No. 16/361,631 dated Apr. 8, 2021, 58 pages.

Ex Parte Quayle Action received for U.S. Appl. No. 29/684,315 dated Apr. 29, 2021, 87 pages.

Bergmann, Martha, Home Screen Sliding Animation, posted at dribbble, URL: <https://dribbble.com/shots/4328249-Home-Screen-Sliding-Animation-1-15> posting date Mar. 10, 2016 Site visited Apr. 22, 2021, 1 page.

Nugroho, Adi, "Daily UI Challenge #10 Simple Date App, posted at dribbble", URL: <https://dribbble.com/shots/3710148-Daily-Ul-Challenge-10-Simple-Date-App> posting date Aug. 3, 2017 Site visited Apr. 22, 2021, 1 page.

Li, Zhi et al., Chinese design No. 303978893, published at Orbit, Dec. 12, 2016, 14 pages.

Yang, Jinlong, Chinese design No. 303329806, published at Orbit, Aug. 12, 2015, 7 pages.

PIAO, Rongwan et al., Chinese design No. 303479533, published at Orbit, Dec. 2, 2015, 6 pages.

Kang, You-Jin et al., Korean design No. 300944195, published at Orbit, Feb. 13, 2018, 7 pages.

Rahimi, Ehsan, "Music Playlist App Interaction, posted at dribbble", URL: <https://dribbble.com/shots/4650389-Music-Playlist-App-I nteraction>, posting date May 30, 2018. Site visited Apr. 24, 2021, 1 page.

Ries, Vilem, "Wanderapp, posted at dribbble", URL: <https://dribbble.com/shots/5402223-Wander-app-interactions-2>, posting date Oct. 16, 2018. Site visited Apr. 24, 2021, 1 page.

Non-Final Office Action received for U.S. Appl. No. 29/684,316 dated Apr. 26, 2021, 75 pages.

Luo, Yi, "Chinese Design No. 304180173", published at Orbit, Jun. 16, 2017, 8 pages.

Song, Yuting, "Chinese Design No. 303841816", Sep. 7, 2016, 6 pages.

Liu, "Chinese Design No. 304005631", published at Orbit, Jan. 11, 2017, 4 pages.

Wang, Yufeng, "Chinese Design No. 303617576", Mar. 16, 2016, 7 pages.

Marcelino, Bruno, "Gestures Glamour: How to Set Up Swipeable Stacked Cards", URL: <https://www.outsystems. com/blog/posts/gestures_glamour_swipeable_stacked_cards/>, Mar. 9, 2018, 13 pages.

Perera, Nimasha, "Card Stack Animation-2, posted at dribbble", URL: <https://dribbble.com/shots/2377045-Card-Stack-Animation-2>, posting date Nov. 28, 2015. Site visited Apr. 20, 2021, 1 page.

Ex Parte Quayle Action received for U.S. Appl. No. 29/684,604 dated Apr. 27, 2021, 62 pages.

Gu, Fengtao, "Chinese design No. 304788552", Aug. 28, 2018, 5 pages.

Xiao, Yao Yao et al., "Chinese design No. 304992731, published at Orbit", Jan. 11, 2019, 5 pages.

Non-Final Office Action received for U.S. Appl. No. 29/684,606 dated Apr. 29, 2021, 79 pages.

Li, Xinrui et al., "Chinese design No. 304220928", Jul. 28, 2017, 9 pages.

Xin, "Chinese design No. 304619594, published at Orbit", May 8, 2018, 9 pages.

Wang, Hong et al., Chinese design No. 303670237, published at Orbit, publication date May 11, 2016. Site visited Apr. 21, 2021. Available from Internet. (Year: 2016), 6 pages.

Kalaska, Maciej, "RouteFinder app, posted at dribbble", URL: <https://dribbble.com/shots/6049671-RouteFinder-app> (Year: 2019), posting date Feb. 20, 2019. Site visited Apr. 24, 2021, 1 page.

Ex Parte Quayle Action received for U.S. Appl. No. 29/684,609 dated Apr. 28, 2021, 82 pages.

Preinterview First Office Action received for U.S. Appl. No. 16/358,380 dated Aug. 5, 2020, 13 pages.

Holland, Jason, "Systems and Methods for Digital Content Navigation Based on Directional Input", U.S. Appl. No. 17/008,089, filed Aug. 31, 2020, 59 pages.

Non-Final Office Action received for U.S. Appl. No. 16/358,025 dated Mar. 1, 2021, 75 pages.

Non-Final Office Action received for U.S. Appl. No. 16/358,032 dated Feb. 3, 2021, 57 pages.

Non-Final Office Action received for U.S. Appl. No. 16/358,032 dated Apr. 3, 2020, 40 pages.

Final Office Action received for U.S. Appl. No. 16/358,032 dated Aug. 25, 2020, 45 pages.

* cited by examiner

Table 900

| Default | Broadcasted Post |
|---|---|
| Ephemeral | Permanent |
| Cover card arranged based on sort order | Cover card at top of scrollable pod display |
| Cover card same size as same-type cover cards | Cover card larger than same-type cover cards |
| Cover post for cover card chosen algorithmically | Post used as cover post for cover card |
| Post arranged with pod based on sort order | Post arranged first in pod |
| No graphical designator | Graphical designator for broadcasted post |
| Commenting disabled | Commenting enabled |

*FIG. 9*

SYSTEMS AND METHODS FOR PRIORITIZING DIGITAL USER CONTENT WITHIN A GRAPHICAL USER INTERFACE

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 9 is table of exemplary ways of prioritizing digital user content within a GUI.

Figure 1:
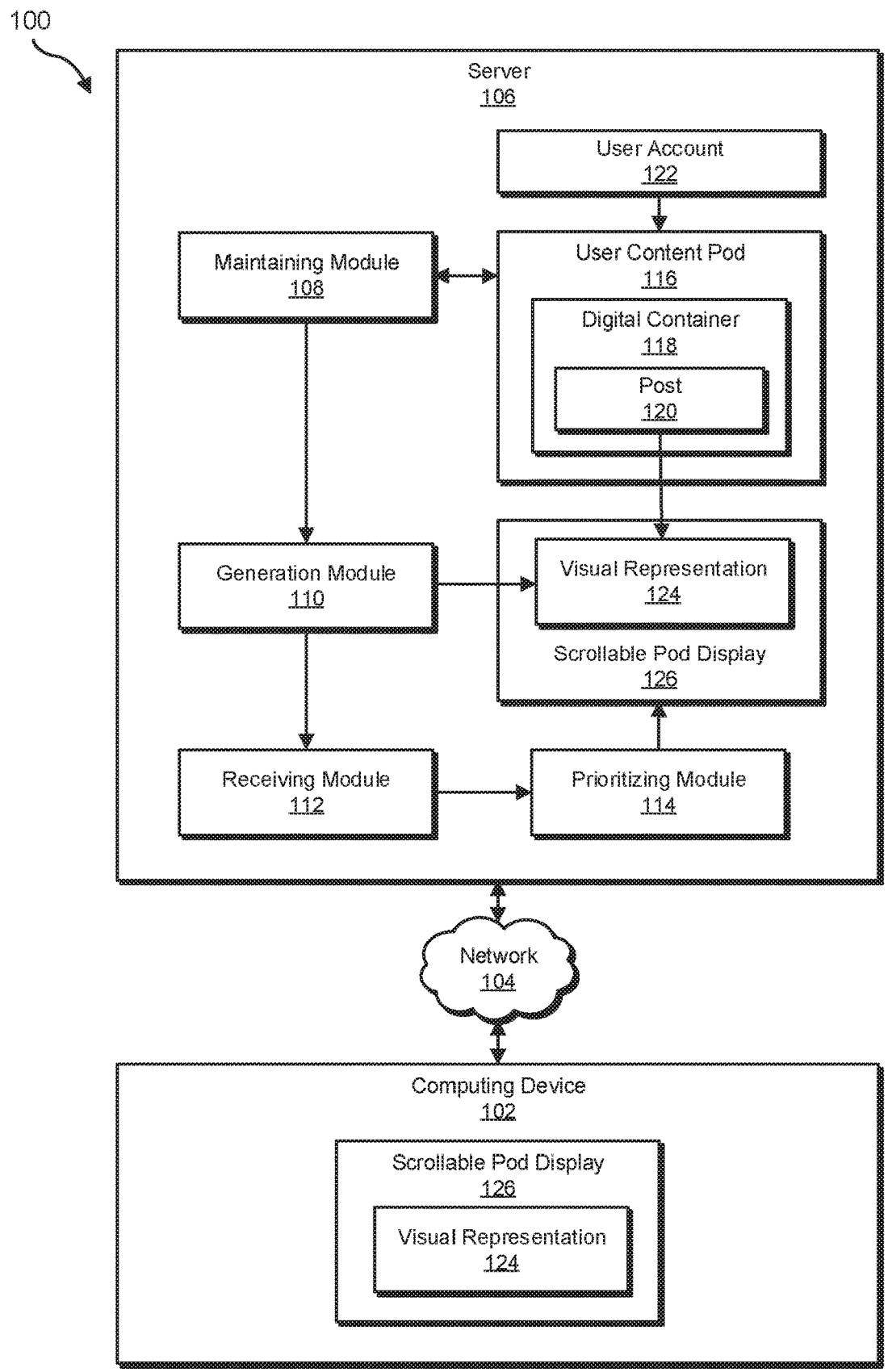
FIG. 1 is a block diagram of an exemplary system for prioritizing digital user content within a graphical user interface (GUI).

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

The present disclosure is generally directed to systems and methods for enabling a user to prioritize the display of their digital user content (e.g., content created, uploaded, and/or curated by the user) within a graphical user interface (GUI) that is visible to other users. In one embodiment, the systems described herein may enable a user to designate a post as a broadcasted post in order to indicate that the post should be prioritized within the GUI. In some examples, a GUI may enable navigation of both (1) a scrollable digest of pods (e.g., storage containers for a user's posts to a social networking platform) and (2) a display of individual posts within a pod. In one such example, the systems described herein may enable a user to prioritize the display of a pod containing a broadcasted post and/or prioritize the display of the broadcasted post within the pod.

In one embodiment, each pod within a social networking platform may have a digital cover card and a digest of pods may represent a display of pod cover cards. In some such embodiments, a GUI dedicated to the display may consist exclusively of pod cover cards. In these embodiments, the cover card of a pod that contains a broadcasted post may be larger, include a special icon, include a depiction of the broadcasted post, be higher up in the display of cover cards, and/or otherwise emphasized. In this manner, the systems described herein may prioritize the representation of the entire pod (e.g., the entire group of posts) based on the user designating a single post within the pod as a broadcasted post.

In another embodiment, the digest of pods may display a series of rows, with each row dedicated to a different pod. In this embodiment, each row may include a horizontally scrollable pod display of posts within its pod and broadcasted posts may appear first within this display, may contain a special icon, and/or may be otherwise visually emphasized. In some embodiments, the systems described herein may prioritize the display of broadcasted posts within a display of individual posts within a pod (e.g., in a pod-content browsing interface rather than a pod digest) in a similar manner. In some embodiments, in addition to prioritizing the display of broadcasted posts within the GUI, the systems described herein may alter the settings of broadcasted posts from the default settings for posts, such as by changing the expiration and/or privacy settings of broadcasted posts.

In some embodiments, the systems described herein may improve the functioning of a computing device by reducing the computing resources (e.g., memory, bandwidth, etc.) required to serve, transmit, and/or load content. In some examples, by enabling a user to prioritize the display of a broadcasted post within a GUI viewed by an additional user who is interested in the post, the systems described herein may avoid serving, transmitting, and loading excesses unwanted posts while the additional user searches for a post of interest. In some embodiments, enabling a user to prioritize the display of a post by broadcasting the post may reduce the likelihood that the user will report the same post and/or interact with the post (e.g., via comments) purely to boost the post's visibility, thus preventing computing resources from being expended creating, processing, and/or storing the duplicate post, extraneous comments, and/or other interactions.

FIG. 1 is a block diagram of an exemplary system 100 for providing a single-surface display for user content. In one embodiment, and as will be described in greater detail below, a server 106 may be configured with a maintaining module 108 that, for each user account within a plurality of user accounts maintained by a social networking platform, maintains a user content pod 116 that includes a digital container 118 for posts (e.g., a post 120) posted to the social networking platform by a user account 122. In one embodiment, server 106 may be configured with a generation module 110 that generates a scrollable pod display 126 that includes visual representations (e.g., a visual representation 124) of other user content pods being followed by user account 122. In some embodiments, a receiving module 112 may receive, from user account 122 corresponding to user content pod 116, user input designating a particular post within user content pod 116 as a broadcasted post and, in response to receiving the user input designating the particular post as a broadcasted post, a prioritizing module 114 may prioritize, within scrollable pod display 126 displayed to a second user account, visual representation 124 of user content pod 116 over visual representations of user content pods that do not contain broadcasted posts.

Server 106 generally represents any type or form of backend computing device that may perform one or more functions directed at enabling digital social networking. In some examples, server 106 may perform social networking functions for and/or in conjunction with a social networking platform. Although illustrated as a single entity in FIG. 1, server 106 may broadly represent any physical or virtual server and/or group of physical and/or virtual servers connected by one or more networks. The term "social networking platform" generally refers to any type or form of digital architecture, provided via server 106, that enables digital social networking. In some examples, the social networking platform may provide one or more status-broadcasting services that enable users to broadcast, consume, and/or digitally respond to user-generated compositions. In one such example, server 106 may provide a pod-based sharing framework, as will be described in greater detail below.

In some embodiments, a computing device 102 may display a GUI and/or scrollable pod display 126 to enable a user to interact with content on the social networking platform. In some embodiments, computing device 102 may communicate with server 106 via a network 104. Computing device 102 generally represents any type or form of computing device capable of reading computer-executable instructions. For example, computing device 102 may represent a smart phone and/or a tablet. Additional examples of computing device 102 may include, without limitation, a laptop, a desktop, a wearable device, a personal digital assistant (PDA), etc.

In some examples, a user of computing device 102 may have user account 122 that is registered with the social networking platform and computing device 102 may have installed an instance of a social media application that operates as part of the social networking platform (e.g., that enables access to services provided by the social networking platform). In addition, or as an alternative, to having the social media application installed, computing device 102 may have installed a browser that may navigate to one or more webpages maintained by the social networking platform.

Figure 2:
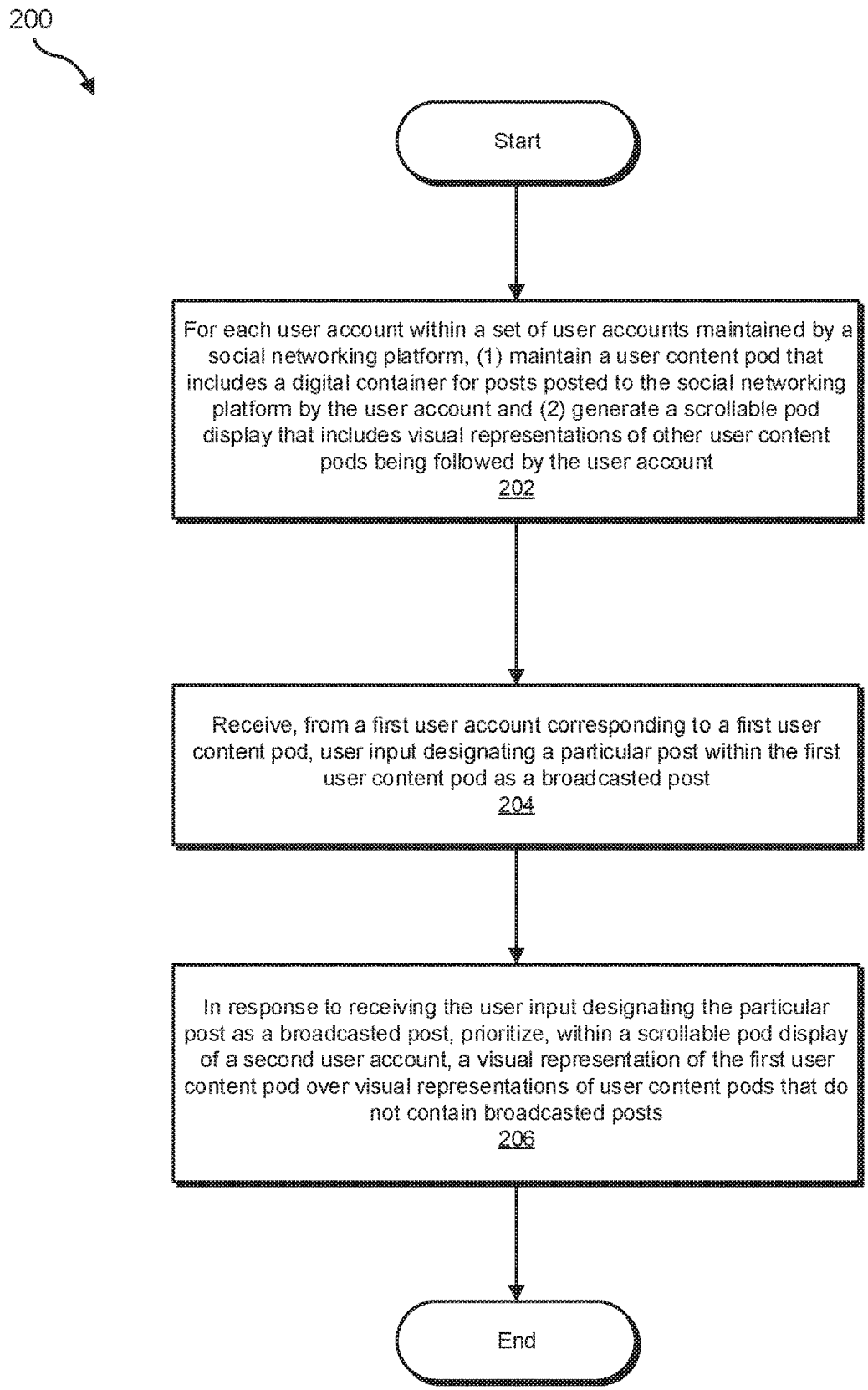
FIG. 2 is a flow diagram of an exemplary method prioritizing digital user content within a GUI.

FIG. 2 is a flow diagram of an exemplary method 200 for prioritizing digital user content within a GUI. As illustrated in FIG. 2, at step 202, one or more of the systems described herein may, for each user account within a set of user accounts (e.g., each user account) maintained by a social networking platform, (1) maintain a user content pod that includes a digital container for posts posted to the social networking platform by the user account and (2) generate a scrollable pod display that includes visual representations of other user content pods being followed by the user account. For example, maintaining module 108 may, as part of server 106 in FIG. 1, maintain user content pod 116 that includes digital container 118 for posts posted to the social networking platform by user account 122 (e.g., post 120) and generation module 110 may generate scrollable pod display 126 that includes visual representations (e.g., visual representation 124) of user content pods being followed by a user account.

The term "digital container" may refer to any type or form of data structure that stores user-generated digital content. In some embodiments, a digital container may be a specific type of data structure, such as an array, a stack, a heap, and/or any other suitable data structure. In one embodiment, a digital container may be defined and/or represented in a database (e.g., as a row, a column, a collection of cells, etc.). In some embodiments, objects within the same digital container may share a label, key, and/or other type of tag that is associated with the digital container. For example, objects within the same digital container may all be tagged with an identifier representing the user account associated with the pod that includes the digital container.

The term "pod" or "user content pod" may refer to any type or form of digital container, maintained by a social networking platform, that is dedicated to storing social media compositions from a designated source (e.g., from a designated user account, digital group, or page of the social networking platform). A user account may generally refer to an account associated with an individual user and/or an entity (e.g., a business, a campaign, a news outlet, etc.). A digital group may generally refer to a group account associated with a designated set of individual users and/or entities (i.e., a designated set of individual user accounts). In some examples, an administrator account (i.e., one or more user accounts designated as an administrator) may manage the group account and one or more contributor accounts (i.e., user accounts designated as contributors to the group account) may add compositions to the group account's digital container. In some examples, a digital group may be based on a mutual interest. A page may generally refer to an individual but non-personal account, such as an account for a business or hobby belonging to a user, where content posted relates to the user's business or hobby rather than the user personally. In other examples, a page may belong to an organization.

In some examples, maintaining module 108 may automatically create a primary pod for each user account that is registered with the social networking platform, which may be dedicated to storing social media compositions created by its corresponding user account. In these examples, maintaining module 108 may maintain each primary pod as long as its corresponding user account is active. Maintaining module 108 may also allow a user to create and add social media compositions to one or more additional pods (e.g., additional individual pods and/or additional group pods). In some examples, an additional pod may be permanent (e.g., configured to be maintained as long as the user account that created the additional pod is active). In other examples, an additional pod may be ephemeral (e.g., set to expire after a certain amount of time).

Each pod maintained by the social networking platform may be designated by a name that distinguishes the pod from other pods. In some examples, the name may be assigned to the pod automatically. For example, a primary pod may be automatically assigned the name associated with its corresponding user account (e.g., the primary account created for the user account of an individual named "Mindy Harris" may be "Mindy Harris.") In other examples, the name may be configurable by a user. For example, an additional pod may be assigned with a name submitted via user input at the time the additional pod is created.

In some examples, a pod may be limited to only storing social media compositions from a single source (e.g., only a single user account may have permission to add social media compositions to the pod). In other examples, a group pod may be limited to only storing posts from a predetermined set of sources (e.g., a limited set of user accounts may have permission to add content to the pod). Additionally or alternatively, a pod may have an open configuration (e.g., selected by an administrator account managing the pod) in which any user account of the social media platform may add content to the pod.

In addition to storing social media compositions, pods may be used as a vehicle for sharing social media compositions (e.g., via a consumption interface, such as a pod digest with scrollable display 126, as will be discussed in greater detail below). In some examples, an audience for a pod may be configurable. For example, a user may select an audience for a pod via a setting in his or her user account. In examples in which a user account may add social media compositions to multiple different pods, a user of the user account may select an audience (e.g., a different audience) for each of the pods. In some embodiments, the systems described herein may include default pod settings for sharing posts within a pod. For example, posts within a pod may be set to be ephemeral by default. In another example, posts within a pod may be set to disable public comments by default (e.g., enabling only private replies to posts). Additionally or alternatively, the systems described herein may enable a user to configure pod post setting.

Maintaining module 108 may sort posts within a user content pod (e.g., may set a default display order for the posts when displayed within a pod content interface) based on a variety of metrics. For example, maintaining module 108 may sort posts within a user content pod based on the creation date of a post, engagement with a post (e.g., comments, shares, reactions, etc.), and/or any other suitable metric. In some embodiments, the display order may change based on user broadcasting input, as will be described in greater detail below in connection with steps 204 and 206.

In addition to maintaining a user content pod for each user account, the disclosed systems and methods may provide each user account with access to a digest of other user content pods. For example, as mentioned previously, generation module 110 may generate a scrollable pod display (e.g., scrollable pod display 126) for a user account that includes visual representations of user pods being followed by the user account. Scrollable pod display 126 may generally represent a pod-centric display, included within a graphical user interface of the social networking platform, of a digest of pods, which scrolls between visual representations of pods in response to user scrolling (e.g., swiping) input.

The visual representations included within scrollable pod display 126 may take a variety of forms. In some embodiments, generation module 110 may generate a cover card for each pod to serve as a visual representation for the pod. The term "cover card" may generally refer to any visual representation of content associated with a user content pod. In some embodiments, a cover card for a pod may include visual representations and/or depictions of one or more compositions within the pod. For example, a cover card may include an image, text, and/or video from a composition within a pod. In one such example, a cover card may be a depiction of a single post within a pod. Additionally or alternatively, a cover card of a pod may include the name and/or a user icon (e.g., profile picture, avatar, etc.) of a user account associated with the pod. In some examples, a cover card may include information about the posts within a pod, such as the number of posts in the pod.

Figure 3:
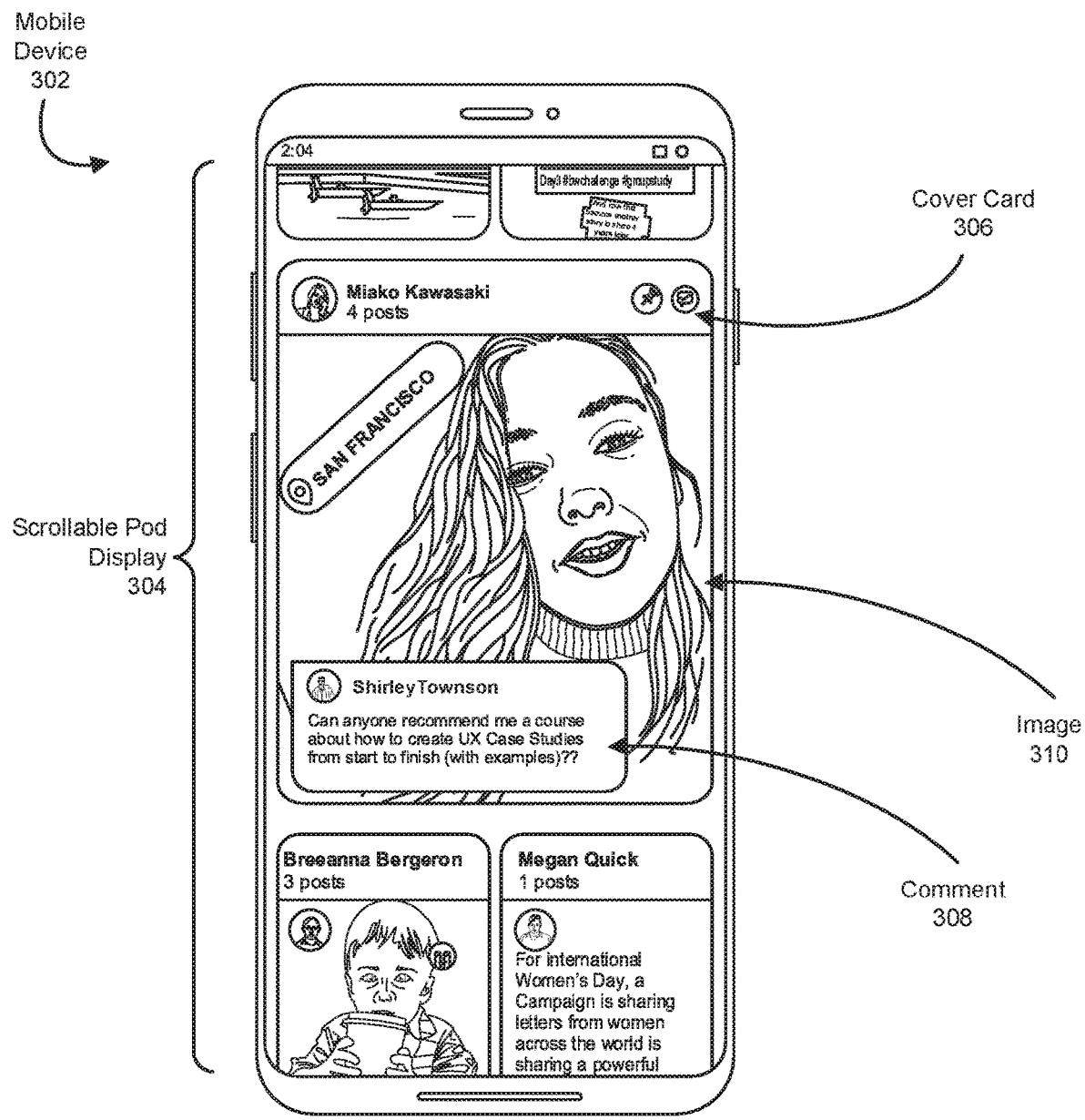
FIG. 3 is an illustration of an exemplary GUI that includes prioritized digital user content.

Generation module 110 may generate a cover card in a variety of ways. In some embodiments, generation module 110 may generate a cover card automatically based on content within the pod. For example, generation module 110 may select a cover post (e.g., a post with content featured in the cover card) based on which post within the pod is most recent, has the highest engagement (e.g., comments and/or reactions), has been pre-selected by the user as a featured post (as will be discussed in greater detail in the following steps), and/or some other metric. Additionally or alternatively, generation module 110 may generate a cover card based on manual user input (e.g., an input selecting a post and/or image to be displayed in the cover card). FIG. 3 provides an illustration of an exemplary cover card 306 with an image 310 that is based on a post (illustrated in FIG. 4) from a corresponding pod.

Figure 6:
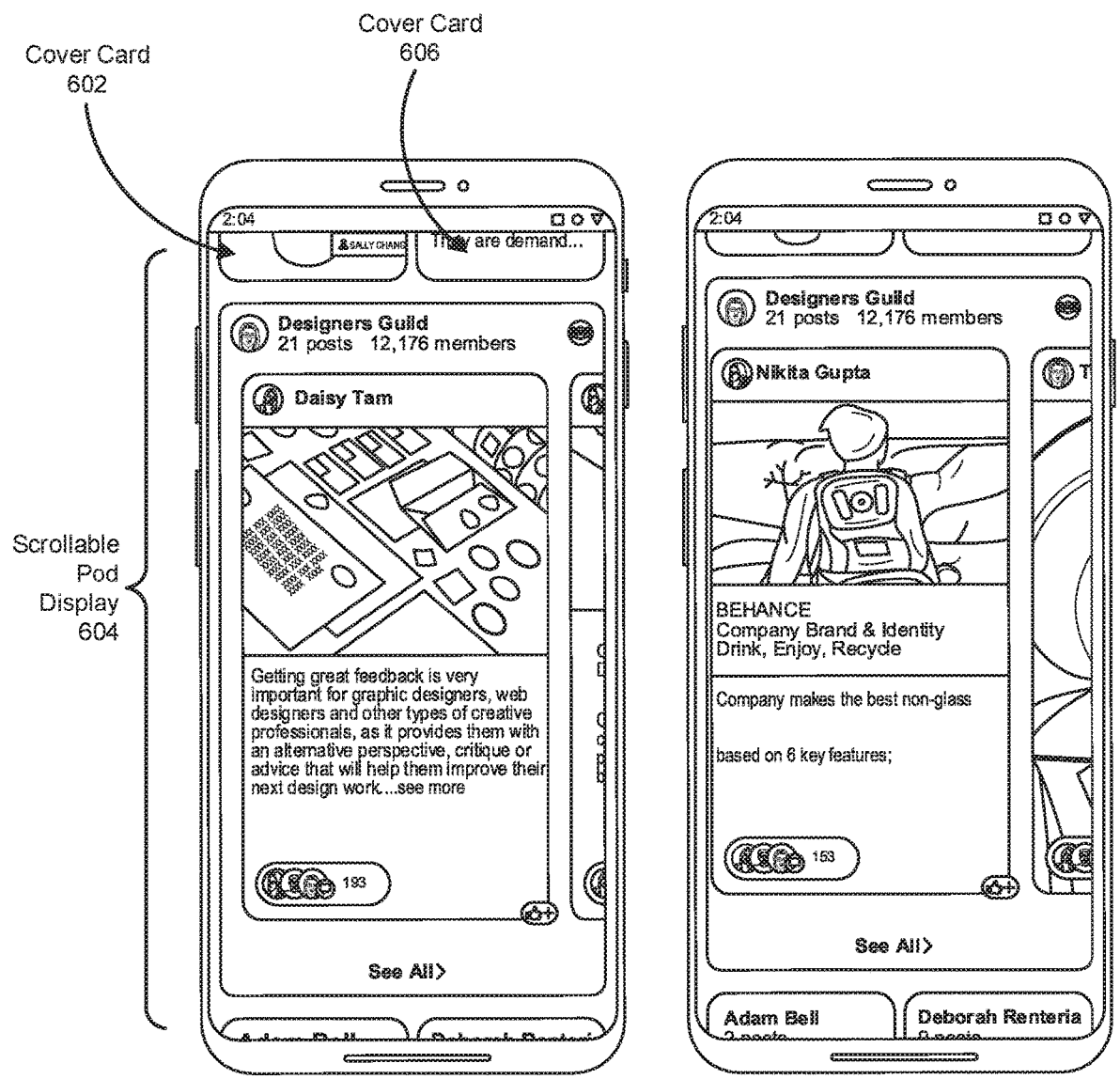
FIG. 6 is an illustration of an additional exemplary GUI that includes prioritized digital user content within group pods.

In some examples, cover cards for pods of different types may visually differ. For example, in embodiments in which maintaining module 108 maintains pods for groups of accounts, generation module 110 may generate cover cards for pods associated with groups of accounts that visually differ from cover cards for pods associated with user accounts. For example, a group cover card may include a group icon and/or a group name (e.g., in addition to a user icon and/or username corresponding to a post being featured in the group cover card). Additionally or alternatively, a group cover card may include multiple featured posts (e.g., as shown in scrollable pod display 604 in FIG. 6), where a cover card associated with an individual user account may only feature a single post (e.g., as shown in cover card 602 and 606 in FIG. 6 and/or each of the cover cards depicted in FIG. 3).

In another example, generation module 110 may generate cover cards for private pods (e.g., pods with only posts that are not open to public commenting) that visually differ from cover cards for public pods (e.g., pods with posts that are open to public commenting). For example, a type of comment affordance displayed in the pods may differ (e.g., private pods may include a comment affordance that enables sending a private reply and public pods may include a comment affordance that enables leaving a public comment).

Figure 4:
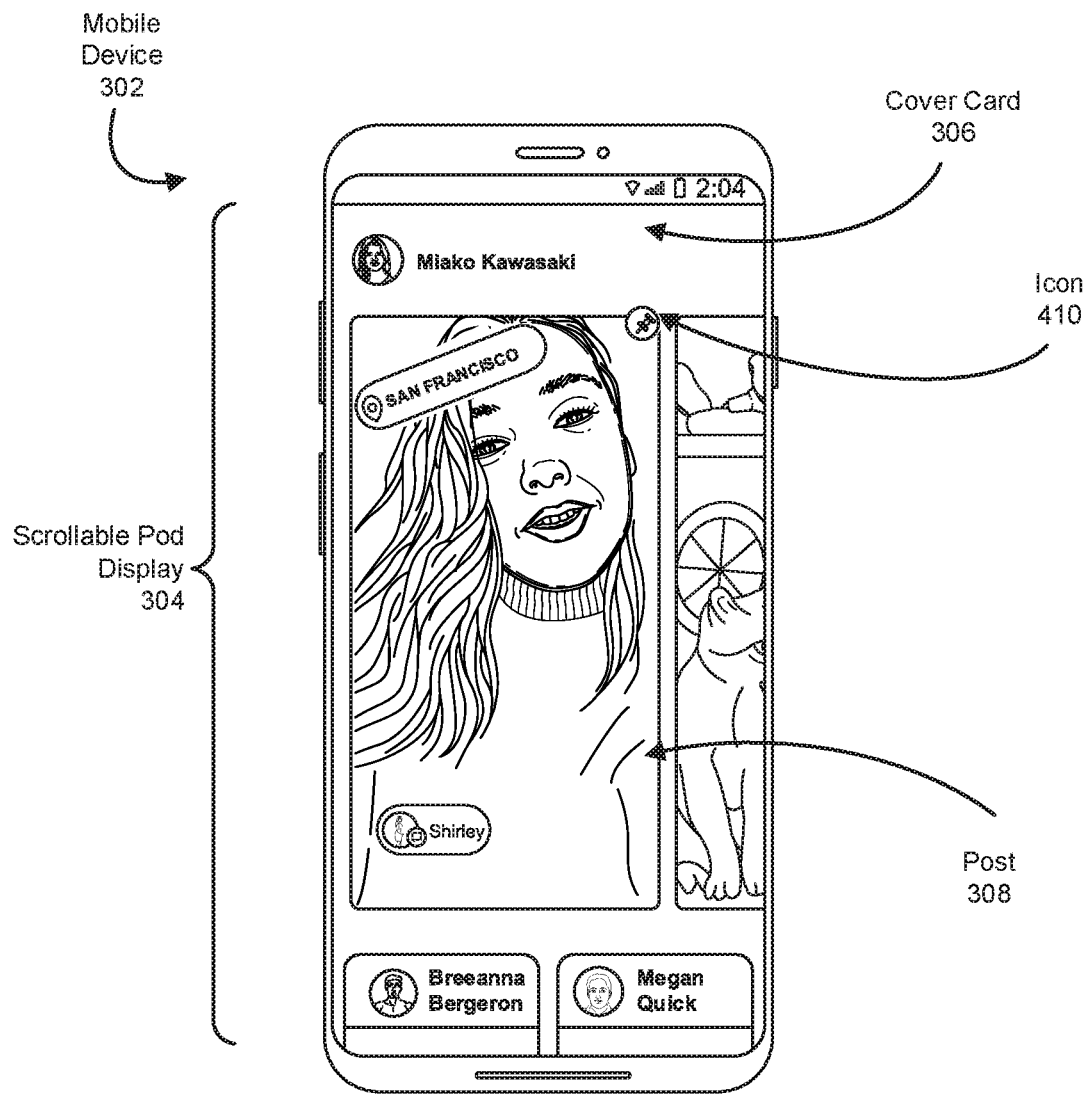
FIG. 4 is an illustration of an additional exemplary GUI that includes prioritized digital user content.
Figure 5:
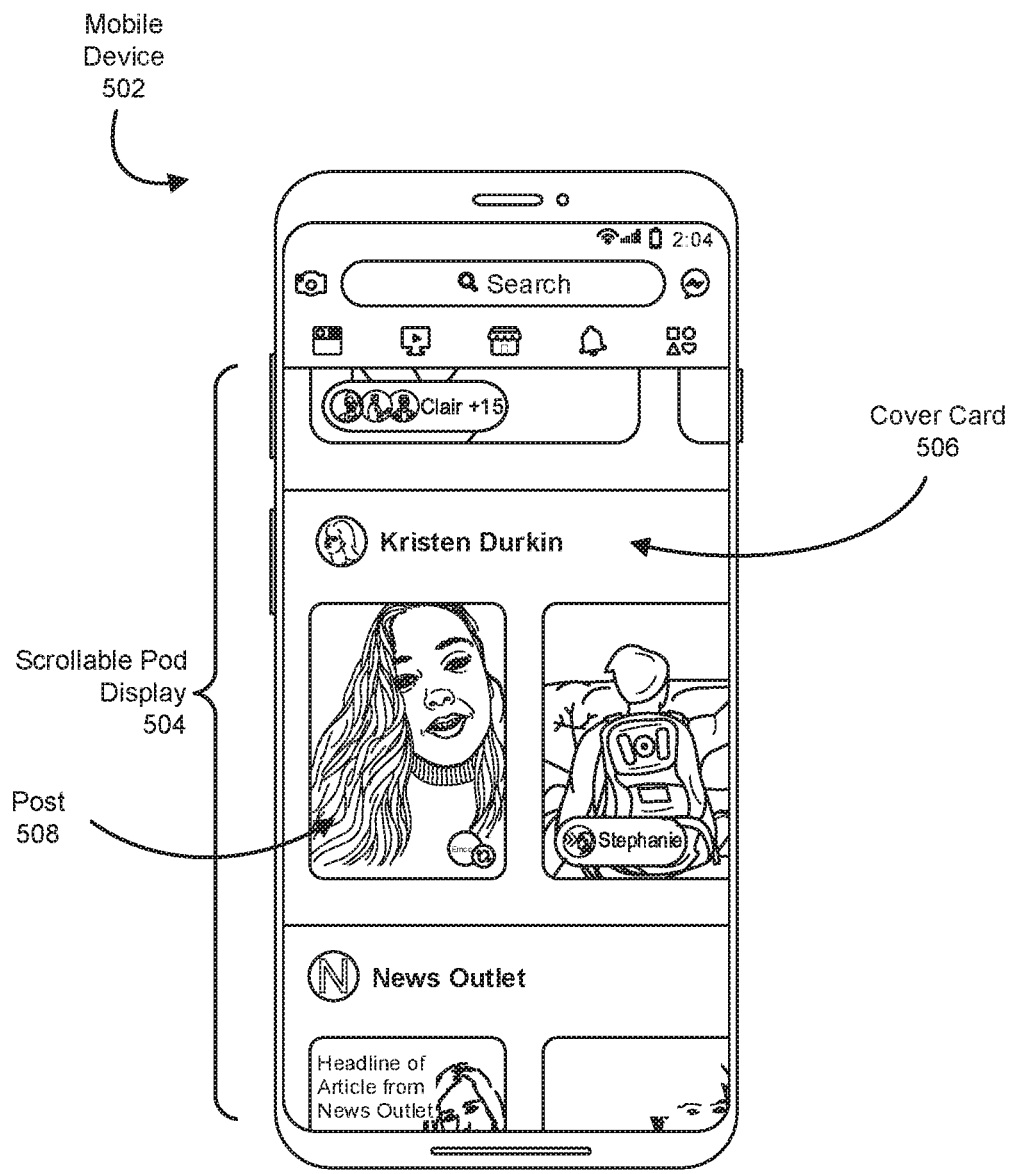
FIG. 5 is an illustration of an additional exemplary GUI that includes prioritized digital user content.

The cover cards (i.e., the visual representations) in a scrollable pod display may be organized within the scrollable pod display in a variety of configurations (e.g., views). In some examples, the visual representations may be organized as a scrollable feed in which a series of rows of cover cards are displayed. Each row may be configured to include any number of cover cards within a row (e.g., one, two, three, etc.). All rows may include the same number of cover cards or the number may vary, as shown in FIG. 3 and as will be described in greater detail in the following steps. In these examples, the scrollable feed of cover cards may expand when a cover card is selected via user input to display additional content from the user content pod corresponding to the selected cover card. For example, cover card 306, in response to being selected via user input, may expand to present a horizontally scrollable pod display of the posts included within the pod represented by cover card 306 (e.g., as depicted in FIG. 4). In another example, the feed may expand to a pod content view that presents a continuous series of the user content pod's posts, one by one (e.g., in a slideshow format). In some embodiments, the default view of the scrollable pod display (e.g., a non-expanded view) may include, within each cover card and/or alongside each cover card, a row of posts from the corresponding user content pod. FIG. 5 provides an exemplary illustration of one such embodiment in which cover cards (i.e., a banner with profile information in this illustration) in a scrollable pod display 504 are arranged vertically, with contents from each pod arranged horizontally below the cover card.

At step 204, one or more of the systems described herein may receive, from a first user account corresponding to a first user content pod, user input designating a particular post within the first user content pod as a broadcasted post. For example, receiving module 112 may, as part of server 106 in FIG. 1, receive, from user account 122 corresponding to a user content pod 116, user input designating post 120 within user content pod 116 as a broadcasted post.

Receiving module 112 may receive the user input through a variety of different user interfaces. For example, a user interface that displays posts (e.g., the scrollable pod display described above, a full-screen display of a post, etc.) may be configured with an option that permits a user to designate a post as a broadcasted post. In another example, the systems described herein may provide a pod management interface and/or a user interface specifically for broadcasting posts, which may enable a user to select a post to broadcast (e.g., from a list of eligible posts). In one embodiment, the systems described herein may provide a user interface element within a post creation interface that enables a user to broadcast a post at the time of creation. In some embodiments, eligible posts for broadcasting may be limited to posts created or managed by the user account submitting the broadcasting input. Additionally or alternatively, eligible posts for broadcasting may be limited to posts created within a certain time span (e.g., within the past week) and/or posts with a certain type of content (e.g., content supplied by the user account rather than links to external content).

In some embodiments, the systems described herein may only permit a user to broadcast a single post per pod at a time. For example, receiving module 112 may receive additional user input designating an additional post within a pod as a broadcasted post and in response, the systems described herein may not enable the additional post to be designated as an additional broadcasted post or may remove the broadcasted designation from the currently broadcasted post and designate the additional post as the broadcasted post for the pod.

In some embodiments, the systems described herein may present the user with a message informing the user of which post is the current broadcasted post. For example, the systems described herein may inform the user that a post that the user attempted to designate as a broadcasted post was not designated as a broadcasted post due to an existing post already being designated as a broadcasted post. In another example, the systems described herein may inform the user that a previously broadcasted post is no longer broadcasted due to a different post being designated as broadcasted.

In one embodiment, the systems described herein may prevent a user from designating a post as broadcasted and/or changing which post is the broadcasted post too frequently (i.e., more than a predetermined frequency). For example, the systems described herein may only permit a user to designate a post as a broadcasted post once per day, once per week, or once per month. In some examples, if a user has permissions to add posts to multiple pods (e.g., a primary and secondary personal pod, or a personal pod and one or more group pods), the systems described herein may track time limits and/or other restrictions on broadcasted posts separately for each pod.

At step 206, one or more of the systems described herein may, in response to receiving the user input designating the particular post as a broadcasted post, prioritize, within a scrollable pod display of a second user account, a visual representation of the first user content pod over visual representations of user content pods that do not contain broadcasted posts. For example, prioritizing module 112 may, as part of server 106 in FIG. 1, in response to receiving the user input designating post 120 as a broadcasted post, prioritize, within scrollable pod display 126 of a second user account, visual representation 124 of user content pod 116 over visual representations of user content pods that do not contain broadcasted posts.

The disclosed prioritization may take a variety of forms. In some embodiments, the systems described herein may prioritize the display of a pod that includes a broadcasted post by increasing the size of the pod in the scrollable pod display and/or by including additional elements in the pod cover card. For example, as illustrated in FIG. 3, the systems described herein may direct a mobile device 302 to display a scrollable pod display 304 of cover cards arranged or mostly arranged in a two-wide grid (i.e., the two-wide grid may represent the default display for pods with only non-broadcasted posts). In this example, the systems described herein may display cover cards of pods with broadcasted posts, such as a cover card 306, at a larger size than cover cards of pods not containing broadcasted posts, such that cover card 306 occupies twice the width of other cover cards (e.g., resulting in cover card 306 being the only post in its row) and/or a greater length than the length of other cover cards.

In some embodiments, cover cards for the same type of pods (e.g., individual pods, group pods, etc.) and/or pods with the same settings (e.g., private pods, public pods, etc.) may be the same size while cover cards of different pod types may differ in size (e.g., group pod cover cards may be larger than individual pod cover cards, public pods may be larger than private pods, etc.). In these embodiments, the cover cards for pods that include a broadcasted post may be larger than cover cards of the same type of pod that do not include a broadcasted post.

In some embodiments, the systems described herein may include an additional element in the cover card of a pod with a broadcasted post (i.e., an element not included in cover cards of pods with only non-broadcasted posts). For example, cover card 306 in FIG. 3 may be configured to include commenting information relating to comments made to the broadcasted post. Such commenting information may include a display of a comment made to the broadcasted post (such as a comment 308), summary information (e.g., an indication of a number of comments that have been made and/or a name of one or more users who have commented), an indication that at least one post of the pod is open to public commenting, etc. Additionally or alternatively, the cover card of a pod with a broadcasted post may include a graphical designator (e.g., a digital icon) associated with broadcasted posts (e.g., an icon of a star, a pin, etc.).

In some examples, the systems described herein may automatically feature a broadcasted post in the corresponding cover card. Returning to FIG. 3 as a specific example, image 310 in cover card 306 may be an image from the correspond pod's broadcasted post. In other examples, a cover card may include text from a broadcasted post, a title and/or headline from a broadcasted post, a still image or clip of a video within a broadcasted post, and/or any additional media from a broadcasted post.

In addition or as an alternative to increasing the size of a cover card and/or selecting or modifying the content displayed within a cover card, in some embodiments, the systems described herein may prioritize the display of a cover card for a pod that includes a broadcasted post positionally. For example, prioritizing module 114 may position the cover card of a pod that includes a broadcasted post ahead of the cover cards of pods with only non-broadcasted posts within the scrollable pod display (e.g., positing the cover card first). Using FIG. 5 as a specific example, the systems described herein may position a cover card 506 for a pod that includes a broadcasted post at the top of scrollable pod display 504, above other cover cards that represent pods that do not include broadcasted posts. In some examples, a cover card's position may be determined based on a combination of factors (e.g., weighted factors) and corresponding to a pod with a broadcast post may be one of the factors. Other factors may include, without limitation, user viewing and/or commenting history, friend history, etc.

In addition to positioning a cover card based on a broadcasting metric, in some examples, a positioning (e.g., ordering) of posts within a pod may be determined based on a broadcasting metric. For example, the disclosed systems may position a broadcasted post first in a display of posts in a pod (i.e., ahead of all the non-broadcasted posts). Using FIG. 4 as a specific example, the systems described herein may direct mobile device 302 to display post 308 (a broadcasted post) ahead of other posts (regardless of other metrics that would otherwise control the post order such as recency). As another specific example, in FIG. 5 the systems described herein may position a depiction of a post 508, which represents the broadcasted post in a pod, first within the horizontal arrangement of depictions of the pod's posts (e.g., to the far left if the viewer's language preference is for a language that reads left-to-right). Additionally or alternatively, the systems described herein may display an icon on a post that identifies the post as a broadcasted post. As a specific example, as depicted by icon 510 on post 508 in FIG. 5, the systems described herein may display a pin icon in the upper-right corner of the post.

In addition to visual changes, in some embodiments, the systems described herein may change one or more privacy options (e.g., an audience setting) for a broadcasted post and/or for a pod that includes a broadcasted post. For example, the systems described herein may enable public commenting on a post in response to the user designating the post as a broadcasted post. In one such example, enabling public commenting may involve changing from a default privacy option that disables public commenting for posts, based on a policy that broadcasted posts enable public commenting, by default, and non-broadcasted posts do not enable public commenting, by default. In one embodiment, a user may be clearly informed that designating a post as broadcasted opens the post to public commenting, which may not be changed by the user without removing the broadcasted designation.

Figure 7:
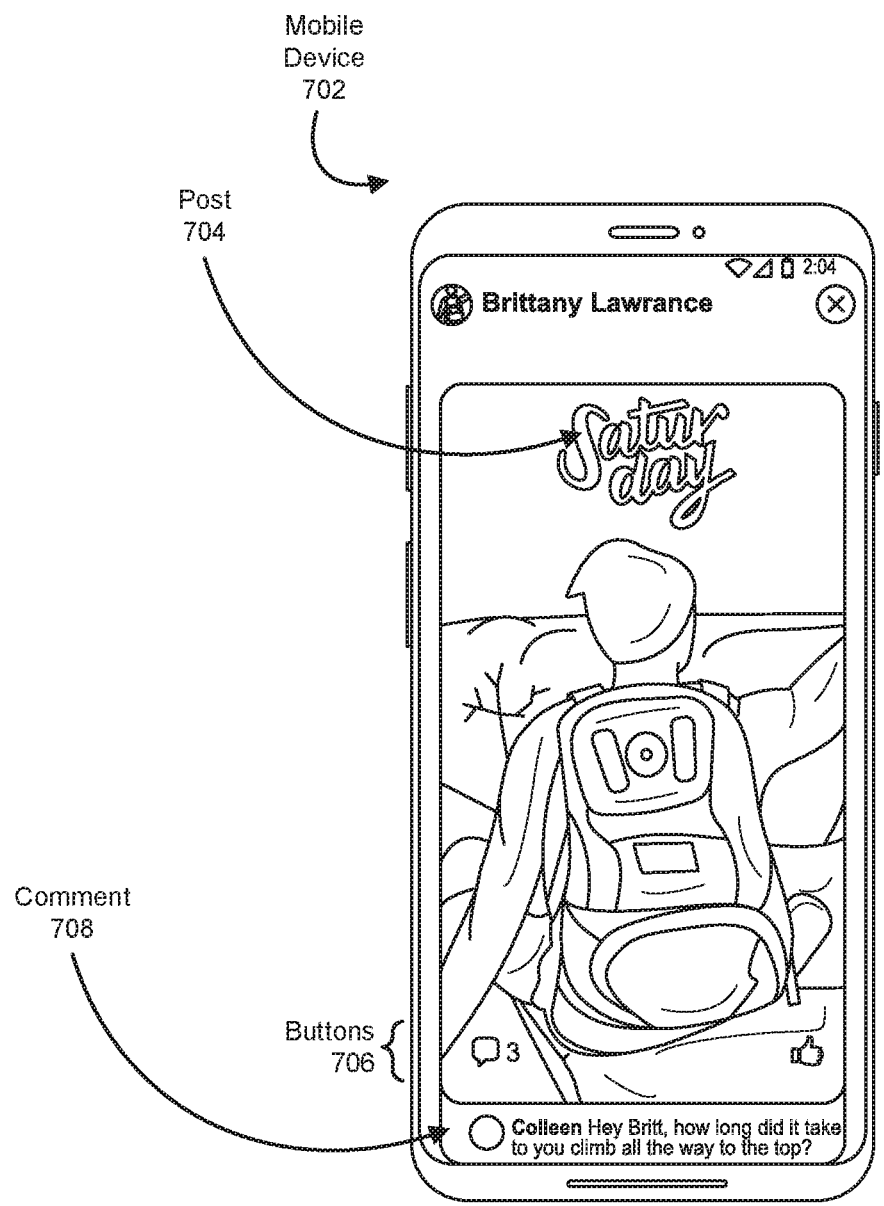
FIG. 7 is an illustration of an additional exemplary GUI that includes prioritized digital user content.

In some examples, the systems described herein may display cover cards of pods with posts that have public comments enabled differently from cover cards of pods with posts that do not have public comments enabled. For example, as illustrated in FIG. 3, the systems described herein may display a comment and/or a comment icon on the pod cover card if public commenting is enabled for at least one post in the pod. Additionally or alternatively, for posts that have public comments enabled, the systems described herein may display commenting features within an individual post (e.g., on a full-screen display of the post). In some embodiments, comments may be visible on posts for which public commenting is enabled. For example, as illustrated in FIG. 7, the systems described herein may direct a mobile device 702 to display a full screen view of a post 704 and may display a comment 708 on post 704. In one embodiment, the systems described herein may display all comments posted to a post with public commenting enabled. Alternatively, the systems described herein may select a single comment to display (as shown in FIG. 7). The single comment may be selected based on the age of the comment (e.g., oldest comment or most recent comment), the level of engagement with the comment (e.g., reactions and/or replies to the comment), and/or some other criteria (e.g., the user account which posted the comment). In one embodiment, receiving user input selecting the single comment may cause the systems described herein to transition to a full-screen display of the post and/or display to additional comments on the post (e.g., a scrollable list of all comments).

Figure 8A:
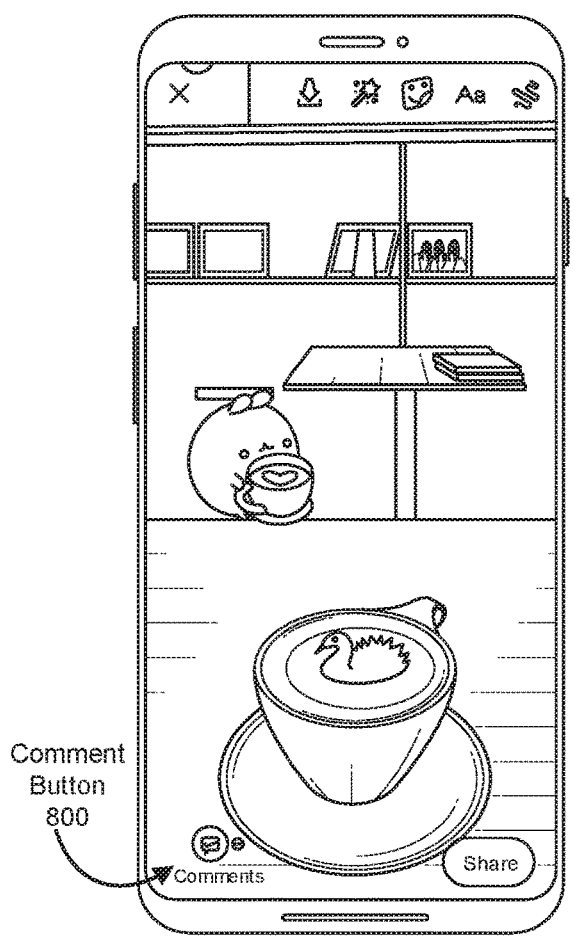
FIGS. 8A and 8B are an illustration of an additional exemplary GUI that includes prioritized digital user comment with different commenting options.
Figure 8B:
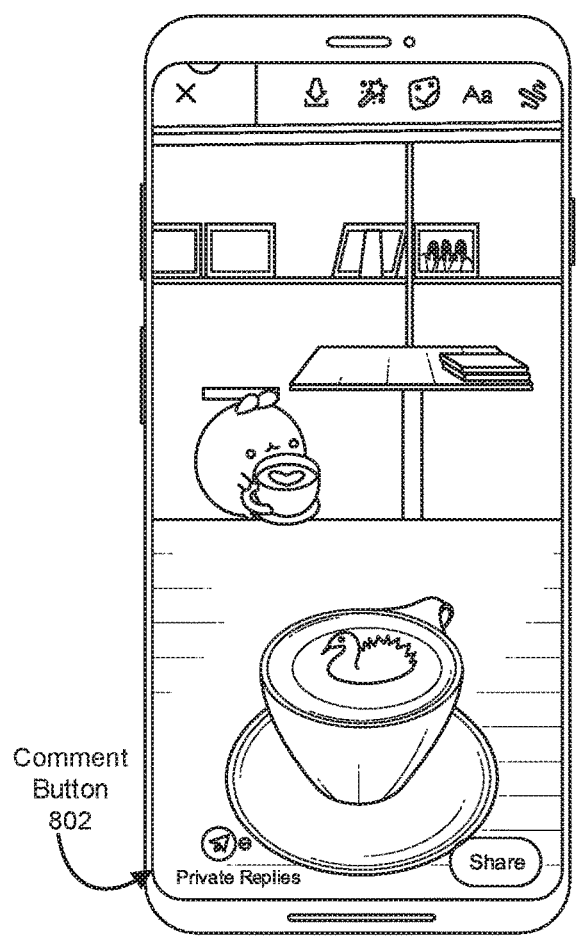

In some embodiments, a post with public commenting enabled may include a display of buttons (e.g., buttons 706 on post 704) that enable a viewer to interact with the comments (e.g., to view previous comments and/or to add a new comment). For example, the systems described herein may display a comment button that shows the current number of comments and, when selected, causes the systems described herein to transition to a display additional comments on post 704. In some examples, the appearance of a comment button may change based on whether public commenting is enabled. Using FIGS. 8A and 8B as a specific example, a comment button 800 (in FIG. 8A) may be included in a post where public commenting is enabled but a different comment button 802 (in FIG. 8B) may be included in a post where public commenting is not enabled (e.g., where only private replies are enabled). In embodiments in which the systems described herein enable public commenting on a post in response to the user designating the post as a broadcasted post, a digital display of the post's pod and/or the post may be transformed to indicate that the pod and/or post is open to public commenting (e.g., using any of the indicators just described above).

In addition to or as an alternative to changing commenting settings from defaults, in some embodiments, the systems described herein may change expiration settings on broadcasted posts from the default. For example, by default, posts may be ephemeral and designating a post as a broadcasted post may change the expiration setting from ephemeral to permanent. In some embodiments, the systems described herein may provide a user with an option to choose whether a broadcasted post is ephemeral or permanent.

As described above, in some embodiments, the systems described herein may prioritize broadcasted posts by applying various combinations of changes from a default mode of presenting and/or configuring posts. Table 900 in FIG. 9 is a summary table of some example changes between a default mode of presenting and/or configuring a post and/or pod and how the systems described herein may present and/or configure a broadcasted post and/or pod that contains a broadcasted post. For example, by default, posts may be ephemeral (e.g., expiring after a certain amount of time) and designating a post as a broadcasted post may change the expiration setting from ephemeral to permanent (e.g., not expiring). In some embodiments, the systems described herein may provide a user with an option to choose whether a broadcasted post is ephemeral or permanent.

In some embodiments, the systems described herein may change how a cover card is displayed in the scrollable pod display based on whether the cover card represents a pod that includes a broadcasted post. For example, by default, cover cards may be arranged based on a sort order, such as oldest first, newest first, highest engagement first, and/or any other suitable sort order. If a pod includes a broadcasted post, the systems described herein may position the cover card for the pod at the top of the scrollable pod display, above the cover cards for pods that do not include broadcasted posts. In some embodiments, the cover cards for pods that include a broadcasted post may be larger than cover cards of the same type of pod that do not include a broadcasted post. In one embodiment, cover cards may by default include a cover post chosen algorithmically from the posts within the pod (e.g., the newest post, the oldest post, the post with the highest engagement, etc.). In some examples, a broadcasted post may automatically be selected as the cover post for the pod containing the broadcasted post.

Additionally or alternatively, the systems described herein may arrange, display, and/or enable interactions with posts differently based on whether the post is broadcasted. For example, by default, posts may be arranged within a pod based on a sort order, such as oldest first, newest first, highest engagement first, or any other suitable sort order. In some examples, a broadcasted post may be positioned before non-broadcasted posts regardless of where the broadcasted post would otherwise be in the sort order. In some embodiments, a broadcasted post may include a graphical designator, such as a pin icon, that identifies the broadcasted post and is not present in non-broadcasted posts. In one embodiment, commenting may be turned off by default for posts and designating a post as broadcasted may turn on commenting for the post. In some embodiments, the systems described herein may enable users to turn off commenting on broadcasted posts.

EXAMPLE EMBODIMENTS

Example 1: A method of prioritizing digital user content with a GUI may include (i) for each user account within a plurality of user accounts maintained by a social networking platform, (1) maintaining a user content pod, comprising a digital container for posts posted to the social networking platform by the user account, and (2) generating a scrollable pod display that includes visual representations of other user content pods being followed by the user account, (ii) receiving, from a first user account corresponding to a first user content pod, user input designating a particular post within the first user content pod as a broadcasted post, and (iii) in response to receiving the user input designating the particular post as a broadcasted post, prioritizing, within a scrollable pod display of a second user account, a visual representation of the first user content pod over visual representations of user content pods that do not contain broadcasted posts.

Example 2: The computer-implemented method of example 1, where each user account is limited to having a single broadcasted post within the user account's user content pod.

Example 3: The computer-implemented method of examples 1-2 may further including receiving, from the first user account, additional user input designating an additional post within the first user content pod as a broadcasted post and, based on the particular post already being designated as a broadcasted post, not enabling the additional post to be designated as an additional broadcasted post or removing the broadcasted designation from the particular post and designating the additional post as a broadcasted post.

Example 4: The computer-implemented method of examples 1-3, where the scrollable pod display of the second user account includes a vertically scrollable pod display and prioritizing the visual representation of the first user content pod includes positioning the visual representation of the first user content pod at the top of the vertically scrollable pod display above the visual representations of the user content pods that do not contain broadcasted posts.

Example 5: The computer-implemented method of examples 1-4, where prioritizing the visual representation of the first user content pod includes displaying the visual representation of the first user content pod at a larger size than the visual representations of the user content pods that do not contain broadcasted posts.

Example 6: The computer-implemented method of examples 1-5, where prioritizing the visual representation of the first user content pod includes affixing a graphical designator to the visual representation of the first user content pod within the scrollable pod display of the second user account.

Example 7: The computer-implemented method of examples 1-6, may further include, in response to receiving the user input designating the particular post as a broadcasted post, changing a privacy option of the particular post to enable public commenting on the particular post.

Example 8: The computer-implemented method of examples 1-7, where changing the privacy option includes changing from a default privacy option that disables public commenting for posts within the first user content pod, based on a policy that broadcasted posts enable public commenting, by default, and non-broadcasted posts do not enable public commenting, by default.

Example 9: The computer-implemented method of examples 1-8 may further include, in response to changing the privacy option, displaying, on the visual representation of the first user content pod, a visual representation of one or more comments to the particular post.

Example 10: The computer-implemented method of examples 1-9, may further include, in response to receiving the user input designating the particular post as a broadcasted post, changing an expiration setting of the particular post from expiring to non-expiring.

Example 11: The computer-implemented method of examples 1-10 may further include featuring a depiction of the particular post within the visual representation of the first user content pod based on the particular post having been designated as a broadcasted post.

Example 12: The computer-implemented method of examples 1-11, may further include, in response to receiving the user input designating the particular post as the broadcasted post, re-ordering a display of posts within the first user content pod to position the broadcasted post ahead of non-broadcasted posts within the first user content pod.

Example 13: The computer-implemented method of examples 1-12, where the scrollable pod displays of the social networking platform are configured to prioritize visual representations of user content pods that include broadcasted posts over the visual representations of the user content pods that do not contain broadcasted posts.

Example 14: A system for prioritizing digital user content within a GUI may include at least one physical processor and physical memory including computer-executable instructions that, when executed by the physical processor, cause the physical processor to (i) for each user account within a plurality of user accounts maintained by a social networking platform, (1) maintain a user content pod, comprising a digital container for posts posted to the social networking platform by the user account, and (2) generate a scrollable pod display comprising visual representations of other user content pods being followed by the user account, (ii) receive, from a first user account corresponding to a first user content pod, user input designating a particular post within the first user content pod as a broadcasted post, prioritize, within a scrollable pod display of a second user account, a visual representation of the first user content pod over visual representations of user content pods that do not contain broadcasted posts.

Example 15: The system of example 14, where each user account is limited to having a single broadcasted post within the account's user content pod.

Example 16: The system for examples 15-16, where the computer-executable instructions that cause the physical processor to receive, from the first user account, additional user input designating an additional post within the first user content pod as a broadcasted post and, based on the particular post already being designated as a broadcasted post, not enable the additional post to be designated as an additional broadcasted post or remove the broadcasted designation from the particular post and designating the additional post a sa broadcasted post.

Example 17: The system of examples 15-17, where the scrollable pod display of the second user account includes a vertically scrollable pod display and prioritizing the visual representation of the first user content pod includes positioning the visual representation of the first user content pod at the top of the vertically scrollable pod display above the visual representations of the user content pods that do not contain broadcasted posts.

Example 18: The system of examples 15-17, where prioritizing the visual representation of the first user content pod includes displaying the visual representation of the first user content pod at a larger size than the visual representation of the user content pods that do not contain broadcasted posts.

Example 19: The system of examples 15-18, where prioritizing the visual representation of the first user content pod includes affixing a graphical designator to the visual representation of the first user content pod within the scrollable pod display of the second user account.

Example 20: A non-transitory computer-readable medium may include one or more computer-readable instructions that, when executed by at least one processor of a computing device, cause the computing device to (i) for each user account within a plurality of user accounts maintained by a social networking platform, (1) maintain a user content pod, comprising a digital container for posts posted to the social networking platform by the user account, and (2) generate a scrollable pod display comprising visual representations of other user content pods being followed by the user account, (ii) receive, from a first user account corresponding to a first user content pod, user input designating a particular post within the first user content pod as a broadcasted post, and (iii) in response to receiving the user input designating the particular post as a broadcasted post, prioritize, within a scrollable pod display of a second user account, a visual representation of the first user content pod over visual representations of user content pods that do not contain broadcasted posts.

As detailed above, the computer devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk dries, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs tat, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical deices, and/or representations of physical devices from one form to another. For example, one or more of the modules recited herein may receive image data to be transformed, transform the image data into a data structure that stores user characteristic data, output a result of the transformation to select a customized interactive ice breaker widget relevant to the user, use the result of the transformation to present the widget to the user, and store the result of the transformation to create a record of the presented widget. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do nt necessarily need to be performed in the order illustrated or discussed. The various exemplary methods described and/or illustrated herein may also omit one or more of the steps described or illustrated herein or include additional steps in addition to those disclosed.

The preceeding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive, Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   for each user account within a plurality of user accounts maintained by a social networking platform, (1) maintaining a user content pod, comprising a digital container for posts posted to the social networking platform by the user account, and (2) generating a scrollable pod display comprising visual representations of other user content pods being followed by the user account;
   receiving, from a first user account corresponding to a first user content pod, user input designating a particular post within the first user content pod as a broadcasted post; and
   in response to receiving the user input designating the particular post as a broadcasted post, prioritizing, within a scrollable pod display of a second user account, a visual representation of the first user content pod over visual representations of user content pods that do not contain broadcasted posts.

2. The computer-implemented method of claim 1, wherein each user account is limited to having a single broadcasted post within the user account's user content pod.

3. The computer-implemented method of claim 2, further comprising:
   receiving, from the first user account, additional user input designating an additional post within the first user content pod as a broadcasted post; and
   based on the particular post already being designated as a broadcasted post:
      not enabling the additional post to be designated as an additional broadcasted post; or
      removing the broadcasted designation from the particular post and designating the additional post as a broadcasted post.

4. The computer-implemented method of claim 1, wherein:
   the scrollable pod display of the second user account comprises a vertically scrollable pod display; and
   prioritizing the visual representation of the first user content pod comprises positioning the visual representation of the first user content pod at the top of the vertically scrollable pod display above the visual representations of the user content pods that do not contain broadcasted posts.

5. The computer-implemented method of claim 1, wherein prioritizing the visual representation of the first user content pod comprises displaying the visual representation of the first user content pod at a larger size than the visual representations of the user content pods that do not contain broadcasted posts.

6. The computer-implemented method of claim 1, wherein prioritizing the visual representation of the first user content pod comprises affixing a graphical designator to the visual representation of the first user content pod within the scrollable pod display of the second user account.

7. The computer-implemented method of claim 1, further comprising, in response to receiving the user input designating the particular post as a broadcasted post, changing a privacy option of the particular post to enable public commenting on the particular post.

8. The computer-implemented method of claim 7, wherein changing the privacy option comprises changing from a default privacy option that disables public commenting for posts within the first user content pod, based on a policy that broadcasted posts enable public commenting, by default, and non-broadcasted posts do not enable public commenting, by default.

9. The computer-implemented method of claim 7, further comprising, in response to changing the privacy option, displaying, on the visual representation of the first user content pod, a visual representation of one or more comments to the particular post.

10. The computer-implemented method of claim 1, further comprising, in response to receiving the user input designating the particular post as a broadcasted post, changing an expiration setting of the particular post from expiring to non-expiring.

11. The computer-implemented method of claim 1, further comprising featuring a depiction of the particular post within the visual representation of the first user content pod based on the particular post having been designated as a broadcasted post.

12. The computer-implemented method of claim 1, further comprising, in response to receiving the user input designating the particular post as the broadcasted post, re-ordering a display of posts within the first user content pod to position the broadcasted post ahead of non-broadcasted posts within the first user content pod.

13. The computer-implemented method of claim 1, wherein the scrollable pod displays of the social networking platform are configured to prioritize visual representations of user content pods that comprise broadcasted posts over the visual representations of the user content pods that do not contain broadcasted posts.

14. A system comprising:
   at least one physical processor;
   physical memory comprising computer-executable instructions that, when executed by the physical processor, cause the physical processor to:
      for each user account within a plurality of user accounts maintained by a social networking platform, (1) maintain a user content pod, comprising a digital container for posts posted to the social networking platform by the user account, and (2) generate a scrollable pod display comprising visual representations of other user content pods being followed by the user account;
      receive, from a first user account corresponding to a first user content pod, user input designating a particular post within the first user content pod as a broadcasted post; and in response to receiving the user input designating the particular post as a broadcasted post, prioritize, within a scrollable pod display of a second user account, a visual representation of the first user content pod over visual representations of user content pods that do not contain broadcasted posts.

15. The system of claim 14, wherein each user account is limited to having a single broadcasted post within the user account's user content pod.

16. The system of claim 15, wherein the computer-executable instructions that cause the physical processor to:
    receive, from the first user account, additional user input designating an additional post within the first user content pod as a broadcasted post; and
    based on the particular post already being designated as a broadcasted post:
        not enable the additional post to be designated as an additional broadcasted post; or
        remove the broadcasted designation from the particular post and designating the additional post as a broadcasted post.

17. The system of claim 14, wherein:
    the scrollable pod display of the second user account comprises a vertically scrollable pod display; and
    prioritizing the visual representation of the first user content pod comprises positioning the visual representation of the first user content pod at the top of the vertically scrollable pod display above the visual representations of the user content pods that do not contain broadcasted posts.

18. The system of claim 14, wherein prioritizing the visual representation of the first user content pod comprises displaying the visual representation of the first user content pod at a larger size than the visual representations of the user content pods that do not contain broadcasted posts.

19. The system of claim 14, wherein prioritizing the visual representation of the first user content pod comprises affixing a graphical designator to the visual representation of the first user content pod within the scrollable pod display of the second user account.

20. A non-transitory computer-readable medium comprising one or more computer-readable instructions that, when executed by at least one processor of a computing device, cause the computing device to:
    for each user account within a plurality of user accounts maintained by a social networking platform, (1) maintain a user content pod, comprising a digital container for posts posted to the social networking platform by the user account, and (2) generate a scrollable pod display comprising visual representations of other user content pods being followed by the user account;
    receive, from a first user account corresponding to a first user content pod, user input designating a particular post within the first user content pod as a broadcasted post; and
    in response to receiving the user input designating the particular post as a broadcasted post, prioritize, within a scrollable pod display of a second user account, a visual representation of the first user content pod over visual representations of user content pods that do not contain broadcasted posts.

* * * * *